May 12, 1953  T. HORYDCZAK  2,638,041
PORTABLE CAMERA SUPPORT
Filed Nov. 7, 1951
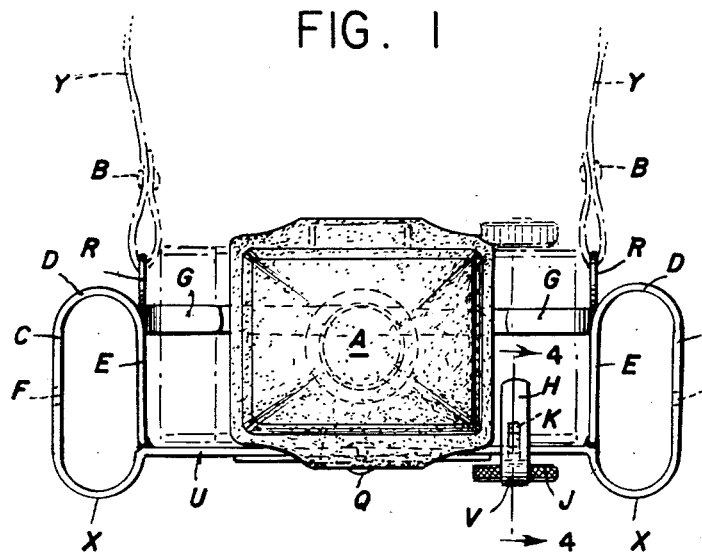
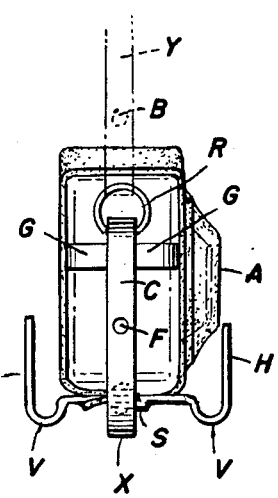
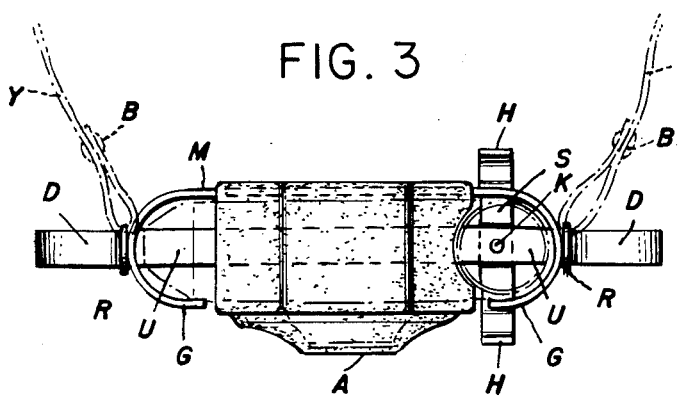
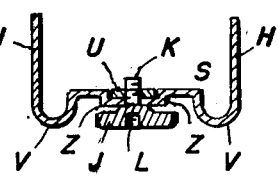
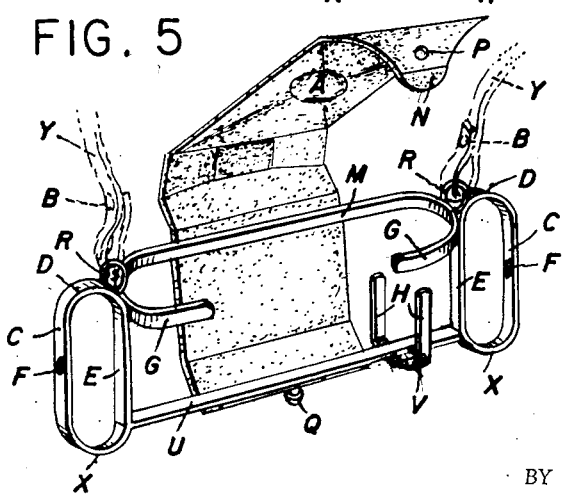
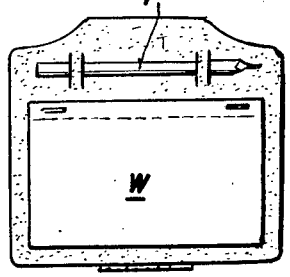
INVENTOR
THEODOR HORYDCZAK,
BY *James M. Drysdale*
ATTORNEY Patented May 12, 1953

2,638,041

UNITED STATES PATENT OFFICE 2,638,041

PORTABLE CAMERA SUPPORT

Theodor Horydczak, Washington, D. C.

Application November 7, 1951, Serial No. 255,239

7 Claims. (Cl. 95—86)

The primary function of this invention is as follows:

While manufacturers of cameras have strived to make a camera as small as possible and yet to make a negative as large as possible, it seems they all practically decided on 35 mm. size cameras.

The cameras are naturally very small and to hold the same securely for the making of an exposure, for which purpose they were devised, it is almost impossible to hold the camera firmly under all conditions whether for instantaneous or time exposure.

My invention as a unit with the camera can be used for instantaneous exposures or on any stand or support for time exposure; for instance, the operator may press one side of the support against any convenient fixed object while firmly holding the other side, thus enabling the operator to make very slow exposures.

This application is a continuation in part of an earlier application Ser. No. 186,606 filed September 25, 1950, by the same inventor since the two applications are co-pending and a substantial part of the disclosure of the first is disclosed in connection with other matter in the second.

One of the objects of this invention is to provide a bracket or support which firmly holds and surrounds the camera so as to prevent damage to the camera caused by dropping.

Another object of this invention is to provide a support for the camera, having means for connectively attaching the camera to the person of the user at all times while in use or when not in use.

Another object of the invention is to provide a handle grip on either side of the camera thereby permitting operation with either or both hands.

A further object resides in the provision of a device which may be supported either in a horizontal position or in a vertical position on a tripod.

A still further object of the invention is to provide a portable camera support that can be attached directly to the camera and may also be simple in construction, durable and efficient for the purpose intended.

Other objects and advantages of the invention will be apparent during the course of the following description.

In the accompanying drawings, forming a part of this specification, and in which like letters are employed to designate like parts throughout the same.

Fig. 1 is a front elevation of my improved camera support; Fig. 2 is a side elevation of the same; Fig. 3 is a top plan view of the device; Fig. 4 is a sectional view on line 4—4 Fig. 1; Fig. 5 is a perspective view of the complete device; Fig. 6 is a rear view of the leather shield showing a pencil and pad attached thereto.

Referring now in detail to the drawings, there is disclosed a leather optic shield or cover A which may be riveted or glued to the base U and slipped over a lug Q on said base. The upper end of the optic shield tapers to a handle portion N provided with a hole P which fits over the lug Q when the shield is in closed position and covering the camera.

The optic shield A is provided for completely surrounding the camera from back to front and the function of same is to keep the lens and shutter clean and covered from the elements; also to keep the film winding window on the camera covered, thereby preventing the light penetration to the film. On the back a suitable note pad and pencil is incorporated.

For simplicity of construction the base U and finger loop or handles C are constructed of a single band of metal or other durable substance.

At each end of the horizontal base U a handle is formed by curving downwardly the metal, then bending same upwardly in a vertical position, thence curving same upwardly and bending the end vertically downward to contact the base portion. Thus at each end of the base a handle is formed having a curved lower portion X upright side portions E and F and a curved upper portion D.

The upper portions D of the finger loop or handles are connected together by means of a band or connecting link M which serves as a support for the rear side of the camera. This support band M lies above and parallel to the base U and terminates at each end with curved portions G which serve as supports for the end portions of the camera, thereby preventing rotation of the camera.

The support band serves as an abutment for the camera back thereby preventing the camera back accidentally becoming open and exposing the films to light.

Welded or riveted to the top portion of each of the handles C is a loop or ring R to which is attached, by means of the slit fastener B an end of the strap Y. This strap Y serves to facilitate carrying the support and camera and is of sufficient length to be looped over the shoulder of the user, by adjusting same.

In using the camera for vertical shots for time exposure it is desirable to attach the camera support to the tripod in a vertical position. For this purpose there is provided a tripod screw hole F in the center of each of the outside upright side portions F of the handles or finger loops C.

The support is also provided with a flash gun arm shown in section in Fig. 4 and also shown in Figs. 1, 2, 3 and 5. This flash gun arm is made of a flat band of metal having a horizontal base portion S at each end of which is a downwardly extending curved portion V which terminates in an upwardly extending vertical portion H. Thus it will be seen that when the flash gun arm is in position the camera support may be firmly supported on a table or any stand since the curved portion V on the flash gun arm and the curved lower portions X on the carrier handles or finger loops C serve as legs of equal length to support the camera support. The flash gun may be attached to either of the vertical portions H.

The flash gun arm when in use is attached to the horizontal base U by means of a thumb screw J having a threaded end K which screws into a captive hole in the base U in a well known manner. The base portion S of the flash gun arm is held in position at right angles to the base U in the usual manner, for example, by providing offsets Z on the base S on either side of the base U as shown in Fig. 4. Sometimes it is desirable to attach the camera support with flash gun arm to a tripod. This is easily effected by providing a threaded hole L in the base of the thumb screw J as shown in Fig. 4. Attaching of the tripod is effected by screwing the tripod screw into the threaded hole L. If so desired there is attached to the back of the leather optic shield, a small writing pad W and a pencil T such, for example, as shown in Fig. 6.

Thus it will be observed that this invention discloses a substantial part of the parent application and in addition thereto shows means such as the openings F for mounting the camera on the tripod in vertical position for vertical shots.

This application also shows an improved flash gun arm and means for mounting the same. A new type of leather optic shield, attached to the carrier is used in place of the ordinary leather case which is a separate article of manufacture and sale.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

I claim:

1. A portable camera support including a band forming a horizontal base, each end of said band being curved downwardly, then extending upwardly in a vertical position, then curved upwardly and then extending vertically downwardly to contact the base portion whereby a handle or finger loop is formed at each end of the support, a ring attached to the top of each of the finger loops or handles.

2. A portable camera support including a band forming a horizontal base, each end of said band being curved downwardly, then extending upwardly in a vertical position, then curved upwardly and then extending vertically downwardly to contact the base portion whereby a finger loop or handle is formed at each end of the support, a ring attached to the top of each of the finger loops or handles, and a connecting link above and parallel to the horizontal base connecting the upper portion of the finger loops or handles whereby to form a support for the rear side of the camera.

3. A portable camera support including a band forming a horizontal base, each end of said band being curved downwardly, then extending upwardly in a vertical position, then curved upwardly and then extending vertically downwardly to contact the base portion whereby a handle is formed at each end of the support, a ring attached to the top of each of the handles, a connecting link above and parallel to the horizontal base connecting the upper portion of the handles whereby to form a support for the rear side of the camera, said connecting link terminating at each end with an inwardly curved portion serving as a support for the end portion of the camera and holding the camera in fixed position.

4. A portable camera support including a band forming a horizontal base, each end of said band being curved downwardly, then extending upwardly in a vertical position, then curved upwardly and then extending vertically downwardly to contact the base portion whereby a handle is formed at each end of the support, a tripod screw hole formed in the center of each of the outside upright portions of the handles a support band above and parallel to the horizontal base connecting the upper portion of the handles whereby to form a support for the rear side of the camera.

5. A portable camera support including a band forming a horizontal base, each end of said band being curved downwardly then extending upwardly in a vertical position, then curved upwardly and then extending vertically downwardly to contact the base portion whereby a handle is formed at each end of the support, a flash gun arm attached to the horizontal base, said flash gun arm having a horizontal base portion terminating at each end with an upwardly extending vertical portion the downwardly curved portion of the band and the curved portion of the flash gun arm serving as legs to support the camera support.

6. A portable camera support including a band forming a horizontal base, each end of said band being curved downwardly then extending upwardly in a vertical position, then curved upwardly and then extending vertically downwardly to contact the base portion whereby a handle is formed at each end of the support, a connecting link above and parallel to the horizontal base connecting the upper portion of the handles whereby to form a support for the rear side of the camera, a flash gun arm attached to the horizontal base, said flash gun arm extending at right angles to the base and a thumb screw for attaching the arm to the base, said thumb screw being provided at its base with a threaded hole for receiving the tripod screw whereby the support and flash gun arm are attached to a tripod.

7. A portable camera support including a band forming a horizontal base, each end of said band being curved downwardly, then extending upwardly in a vertical position, then curved upwardly and then extending vertically downwadly to contact the base portion whereby a handle is formed at each end of the support, a lug on said base, a leather optic shield or cover attached at its lower end to the base and slipped over the lug on the base, the upper end tapering to a handle portion provided with a hole which fits over the lug when the shield is in closed position and covering the camera.

THEODOR HORYDCZAK.

References Cited in the file of this patent

UNITED STATES PATENTS

| Number | Name | Date |
|---|---|---|
| 1,925,694 | Hawkins | Sept. 5, 1933 |
| 2,005,366 | Gaty | June 18, 1935 |
| 2,172,348 | Githens | Sept. 12, 1939 |
| 2,466,713 | Kraus | Apr. 12, 1949 |
| 2,551,753 | McCullough | May 8, 1951 |